United States Patent [19]

Case, Jr. et al.

[11] Patent Number: 4,521,670
[45] Date of Patent: Jun. 4, 1985

[54] GAS METAL ARC WELDING TORCH WITH VISION SYSTEM

[75] Inventors: Allen W. Case, Jr., Amsterdam; Donald C. Peroutky, Schenectady, both of N.Y.

[73] Assignee: General Electric Company, Schenectady, N.Y.

[21] Appl. No.: 528,753

[22] Filed: Sep. 1, 1983

[51] Int. Cl.³ ............................................. B23K 9/10
[52] U.S. Cl. ............................... 219/130.01; 219/72; 219/124.34; 219/136
[58] Field of Search ............. 219/124.34, 130.01, 219/137.2, 123, 72, 136

[56] References Cited

U.S. PATENT DOCUMENTS

| | | | |
|---|---|---|---|
| 1,869,350 | 7/1932 | Lincoln | 219/123 |
| 2,053,417 | 9/1936 | Brace | 219/72 |
| 2,876,330 | 3/1959 | Reinhardt | 219/137.2 |
| 4,450,339 | 5/1984 | Corby, Jr. | 219/124.34 |

FOREIGN PATENT DOCUMENTS 339361  7/1972  U.S.S.R. ................ 219/136

OTHER PUBLICATIONS

Tweco Catalog No. MG5-73, pp. 1-8, 9/1973.
R. W. Richardson, et al., "A Vision Based System for Arc Weld Pool Size Control," Measurement and Control for Batch Manufacturing, ed. by D. E. Hardt, WAM ASME, Nov. 1982, pp. 65-75.

Primary Examiner—Clifford C. Shaw
Attorney, Agent, or Firm—Donald R. Campbell; James C. Davis, Jr.; Paul R. Webb, II

[57] ABSTRACT

A gas metal arc welding torch has an integral optical system which images the weld puddle on the face of a fiber optic cable. A concentric torch configuration is disclosed having a slim profile filler wire guide that is removably mounted on the ring-shaped torch body and projects into the gas cup at an angle to the optical axis to minimize obstruction of important regions of the weld scene. The fiber optic cable is coupled to a video camera and a viewing system or controller; real time observation of the weld area is made and used to control the weld process.

5 Claims, 6 Drawing Figures

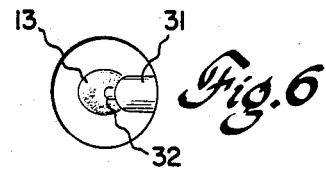
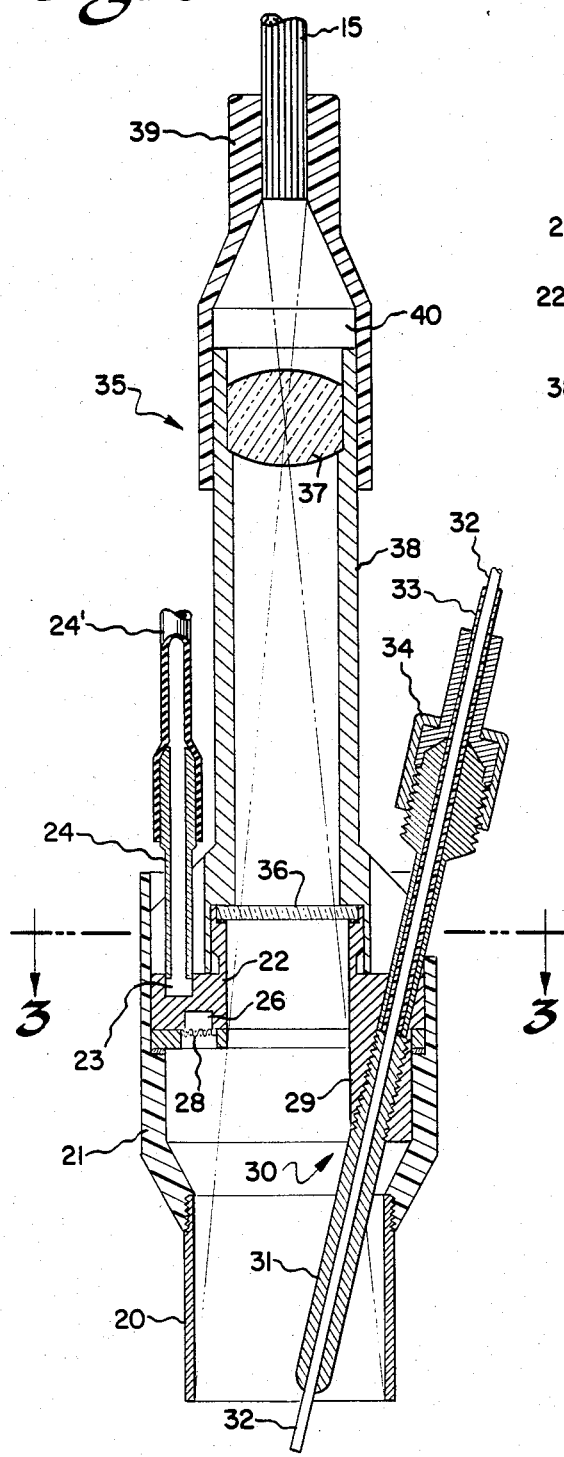
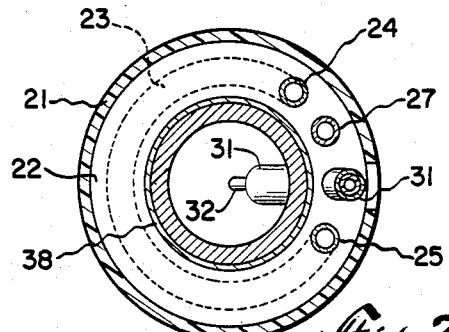
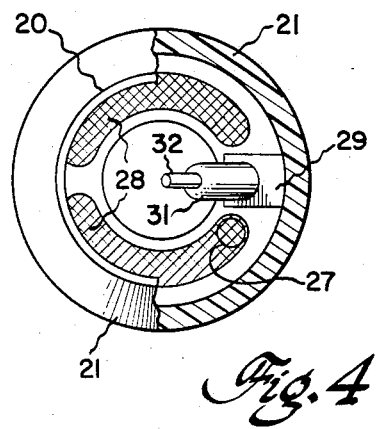
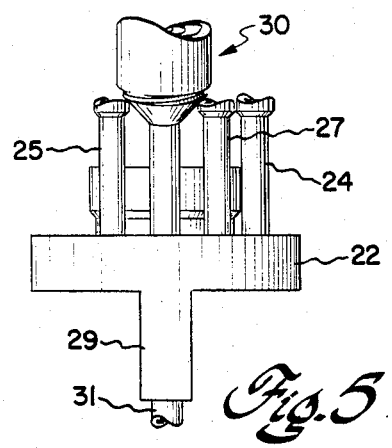

GAS METAL ARC WELDING TORCH WITH VISION SYSTEM

BACKGROUND OF THE INVENTION

This invention relates to metal inert gas welding and more particularly to a welding torch with an integral optical system which directly views the weld area.

Good arc welds are achieved by controlling weld current, arc voltage, weld penetration, centering of the weld puddle over the weld joint, weld bead lay rate, etc. When welding manually or by machine, welds can be of marginal quality due to limited visual access to the weld region and the necessity of controlling the weld parameters on the basis of past experience or predicted part geometry. For consistently good welds, some means is necessary for real time sensing of weld puddle characteristics and for using this sensed information as feedback to control the weld parameters to achieve optimum welds.

Some welding experiments for gas tungsten arc welding have been conducted at Ohio State University Center for Welding Research in which a strictly laboratory setup was used to optically observe the weld puddle during the welding operation. Subsequent developments and a viewing system in which the optical axis coincides with the weld torch and electrode axis were reported by R. W. Richardson et al. at the ASME Winter Annual Meeting, Nov. 14–19, 1982.

An arc welding torch that has a built-in vision sensor and a configuration suitable for industrial welding is described in copending application Ser. No. 401,471, filed July 26, 1982, now abandoned, and continuation application Ser. No. 619,432, filed June 11, 1984, now U.S. Pat. No. 4,488,032 A. W. Case, Jr., N. R. Kuchar and D. C Peroutky. This torch presents minimum obstruction to passage of light to the optical lens; the slim profile tungsten electrode holder is out of focus and not seen in the image of the weld puddle and weld area. When coupled to a remote video camera and welding controller, the torch-vision system permits control of torch manipulation and of the weld process. While disclosed for both GTA and GMA welding, the illustrated embodiments are the former. This and other subsequently filed applications are assigned to the same assignee.

SUMMARY OF THE INVENTION

An object of the invention is the provision of a GMA welding torch with an integral vision system that, in machine welding applications under robotic control, can use the weld region vision sensing capability as a feedback element and achieve consistently better welds than with conventional torches. The torch-vision system incorporates a compact configuration, is light weight, has a wide field of view at the weld region, and has effective cover gas shielding.

Such a torch with a consummable electrode is comprised of a torch body having electrical power, coolant, and cover gas connections, supported inside a housing to which the gas nozzle is attached. The center of the torch is cleared and the integral optical system focuses an image of the workpiece and weld region onto the face of a fiber optic cable. A filler wire guide mounted on the torch body has a slim profile and projects into the gas nozzle at an angle to the optical axis to minimize obstruction to passage of light to the optical system from important regions of the weld scene. The filler wire guide conveniently is comprised of a small diameter contact tube and is removable, and a set of guide tubes are provided to accomodate different filler wire/electrode diameters.

A concentric welding torch has a generally ring-shaped copper torch body, and the built-in optical system is mounted on the torch body and its axis passes through the center of the ring and gas cup. The feed wire guide is screwed into the torch body and provides for uncurved passage of the filler wire/electrode. The contact tube is sufficiently far removed from the focal plane of the optical system so that its image is minimized in the weld scene. The image is transferred over the fiber optic cable to a video camera and hence to a welding controller to control torch movement and power supply adjustments to make quality welds.

BRIEF DESCRIPTION OF THE DRAWINGS

FIG. 2 is a vertical cross section through the optical welding torch and filler wire guide.

FIG. 3 is a horizontal cross section through the concentric torch taken approximately on line 3—3 in FIG. 2.

FIG. 4 is a bottom view of the torch partly in section.

FIG. 5 shows the torch body and part of the filler wire guide and power, gas and coolant connection tubes.

FIG. 6 is the view of the weld region seen through the window in the torch.

DETAILED DESCRIPTION OF THE INVENTION

Figure 1:
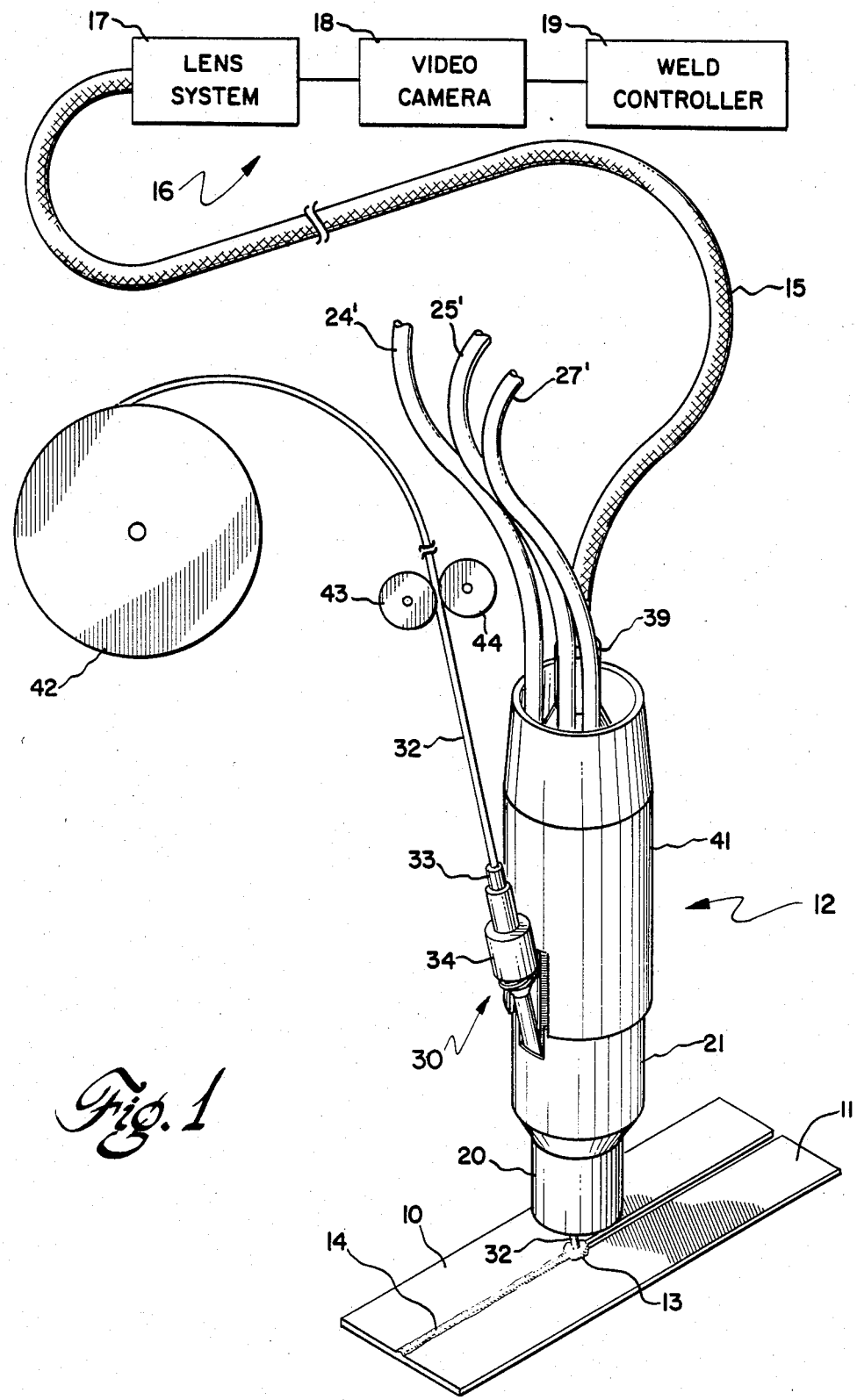
FIG. 1 shows seam welding with a metal gas arc welding torch which has a built-in vision sensor and a feedback control system.

In FIG. 1, workpieces 10 and 11 are seam welded by a gas metal arc welding torch 12 that has a built-in optical system to directly view the weld region. The weld puddle 13, part of the remelt zone 14, and adjacent weld area are imaged on the face of a fiber optic cable 15 which transfers the image to a remote viewing or control system 16. The image of the weld scene is magnified by a lens system 17 and relayed to a video solid state camera 18 such as General Electric's TN2500 Charge Injection Device Camera; the video output is fed to a computerized weld controller 19 and used in a feedback arrangement to control movement of the torch and the welding process to achieve consistently good quality welds. The signal read out of the camera may be presented to a video monitor where the image is viewed by the operator.

The concentric GMAW torch with an integral vision sensor is shown in more detail in FIGS. 2-5 and can be employed in almost all applications in which a conventional welding torch is used. This torch-vision system is compact and light weight, has a large field of view of the weld area, and provides for a gas lens effect in the cover gas flow for effective gas shielding. Typically the overall length of such a torch is about 7 inches. An optical lens is located directly above the consummable electrode and focuses the weld region image on the entrance end of the fiber optic bundle. The filler wire contact tube or guide is removably mounted on the copper torch body.

Referring to FIG. 2, metal gas cap or nozzle 20 is attached to an insulating housing section 21 which encloses and supports the ring-shaped torch body 22. The upper half of the ring contains a water passage 23. Coolant enters one end of the channel through an inlet tube 24 and exits the other end, FIG. 3, through another tube 25. One of the water inlet and outlet tubes has a metal braid jacket to conduct electrical power to the torch in addition to coolant, as is conventional in the art.

The lower half of copper ring 22 contains a gas passage 26 for an inert gas such as argon or a mixture of inert gases. Welding cover gas enters the channel 26 through another tube 27, and exits through a gas lens 28 and through the torch gas cup 20 to cover the weld region. The gas lens 28, FIG. 4, consists of a permeable barrier of alternate layers of fine wire mesh which produce a stable stream of shielding cover gas. By focusing the gas into a coherent stream, the covering ability of the shielding gas is effective at greater gas cup to workpiece distances than is possible without the lens. The three copper tubes 24, 25 and 27, which are the coolant, electrical power, and gas connections, are inserted into holes in the top of ring 22 and held in place by soldering.

As seen in FIG. 2 and in FIG. 5, which is a side view of the torch body and a partial view of the wire guide and coolant, gas, and electrical power connections, torch body 22 has a depending dog leg 29 into which is inserted the filler wire guide 30. A straight, small diameter contact tube 31 has screw threads near the center and at one end to fasten it to the torch body and to a feed wire cable. Filler wire/electrode 32 is threaded through an insulating wire guide liner 33 which is inserted into the top half of contact tube 31 to the shoulder. Feed cable coupling 34 is rotated down to complete the connection. Contact tube 31 is made of hardened copper and the filler wire is the same material as the workpiece or a compatible material. Contact tube 31, liner 33, and disconnect coupling 34 can be changed to accomodate different filler wire/electrode diameters. A set of these copper contact tubes 31 are provided having the same outside diameter but various inside diameters to accomodate the different filler wire diameters. Filler wire guide 30 is angled with respect to the axis of the optical system. There is provision for uncurved passage of the filler wire/electrode through the close-fitting contact tube 31. Also, this configuration minimizes obstruction to passage of light to the optical system from important regions of the weld scene.

The optical system is comprised of a simple lens which images the weld region on the entrance end of a fiber optic bundle by means of which the image can be conveniently transferred to a remote viewing or control system. The optical system 35 looks at the weld region through the center of the torch body ring 22. Filler wire guide 30 is sufficiently far removed from the focal plane of the optical system so that its image is minimized in the weld scene. A transparent, heat reflecting window 36 located between the torch body 22 and an optical lens 37 prevents gas flow in any direction except out through the gas cup 20. Lens 37 is, for instance, a doublet or triplet, and is mounted in a removable, metal, cylindrical lens housing 38 which is fastened to the top of torch body 22 by means of lock screws, pressing down on the quartz window 36. Lens housing 38 is at the same potential as torch body 22 but conducts substantially no current. The lens may have an aperture and focal length to just image a one inch diameter field of view on the full face of a 0.2 inch diameter coherent fiber bundle with an approximate ±0.25 inch depth of field. During the weld operation the end of filler wire/electrode 32 is beyond the end of the gas cup 20 and approximately at the center of the gas cup and on the optical axis.

The optical system 35 has a fixed lens and fiber optic cable 15 is adjustable to focus the image of the weld puddle and weld area on the face of the cable. A bundle housing 39 made of insulating material slides down over lens housing 38 and has an interior stop 40. The end of the cable is held in a cylindrical cavity in the top of the bundle housing.

FIG. 6 is a view of the weld region through quartz window 36. The weld puddle 13, small diameter contact tube 31, and filler wire/electrode 32 would be seen if one looked down through this window. However, the contact tube has a relatively small cross section and is angled with respect to the optical axis, and is far enough removed from the focal plane that its image is minimized in the image of the weld puddle and weld area transferred to the video camera.

The coolant, electrical power, and gas connection tubes 24, 25 and 27 are near the periphery of the torch body, outside of and concentric with the lens housing 38. The insulating plastic sleeve 41 shown in FIG. 1 covers these components. The water inlet hose 24', water/power cable 25' and gas supply line 27' plus the fiber optic cable 15 are made to exit away from the weld area. A commercially available coherent fiber optic cable is employed; the image picked up at one end of the cable is transmitted point for point to the other end. Feed wire 32 from a supply reel 42 passes between rollers 43 and 44 which control its rate of feed into GMAW welding torch 12. A mounting bracket (not shown) permits mounting the welding torch 12 to the wrist or arm of a robotic machine.

The concentric configuration and novel structure of this torch makes a compact lightweight device not unlike a conventional welding torch, but having a built-in optical system which conventional torches do not have. The invention is usable with other optical welding torch configurations such as the offset and folded embodiments described in the aforementioned application Ser. No. 619,432, which gives more information on the concentric torch.

While the invention has been particularly shown and described with reference to a preferred embodiment thereof, it will be understood by those skilled in the art that the foregoing and other changes in form and details may be made therein without departing from the spirit and scope of the invention.

The invention claimed is:

1. A compact gas metal arc welding torch with an integral vision sensor comprising:
   a ring-shaped conductive torch body having internal passages for coolant and cover gas and, near the periphery, electrical power, coolant and cover gas connections;
   a housing that encloses and supports said torch body and to which a gas cup is attached;
   an integral optical system having an axis that passes through the central region of said torch body and gas cup is comprised of a lens system in a lens housing which is mounted on said torch body, said optical system viewing the workpiece and weld region through the center of said ring-shaped torch body and providing a demagnified image;
   means on said torch for transferring said image to a remote control system; and a slim profile filler wire/electrode guide mounted on said ring-shaped torch body and projecting into said gas cup at an angle to the optical axis to minimize obstruction to passage of light from the weld region to said optical system, and sufficiently far removed from the focal plane that said wire guide is minimized in said image.

2. The welding torch of claim 1 wherein said wire guide is removable and a set of said wire guides are provided with various inside diameters each accomodating a different filler wire/electrode diameter.

3. The welding torch of claim 2 wherein said wire guide is comprised of a straight contact tube having screw threads near the center and one end to fasten it to said torch body and to a feed wire cable.

4. The welding torch of claim 1 wherein said torch body is copper and said wire guide is comprised of a straight copper contact tube and is removable.

5. The welding torch of claim 4 wherein a set of said wire guides are provided with various inside diameters each accomodating a different filler wire/electrode diameter.

* * * * *